(12) United States Patent
Dickenson (10) Patent No.: US 9,146,902 B2
(45) Date of Patent: Sep. 29, 2015

(54) PARALLEL COMPUTATION OF MATRIX PROBLEMS

(76) Inventor: Paul Frederick Cilgrim Dickenson, Cheltenham (GB)

(*) Notice: Subject to any disclaimer, the term of this patent is extended or adjusted under 35 U.S.C. 154(b) by 65 days.

(21) Appl. No.: 13/432,279

(22) Filed: Mar. 28, 2012

(65) Prior Publication Data

US 2012/0249560 A1 Oct. 4, 2012

(30) Foreign Application Priority Data

Apr. 1, 2011 (GB) .................................. 1105576.1

(51) Int. Cl.
*G06F 15/80* (2006.01)
*G06F 17/16* (2006.01)
*G06F 17/50* (2006.01)

(52) U.S. Cl.
CPC ............ *G06F 17/16* (2013.01); *G06F 17/5009* (2013.01); *G06F 2217/16* (2013.01)

(58) Field of Classification Search
CPC ..... G06F 15/80; G06F 2217/16; G06F 17/16; G06F 15/82; G06F 9/3853; G06F 17/30324; G09G 3/3216
USPC ............................................. 345/505; 703/9
See application file for complete search history.

(56) References Cited

U.S. PATENT DOCUMENTS

| | | | | |
|---|---|---|---|---|
| 7,124,069 B2 * | 10/2006 | Meuris et al. | ................... | 703/13 |
| 7,519,518 B2 * | 4/2009 | Langemyr et al. | ................ | 703/2 |
| 7,580,821 B2 | 8/2009 | Schirm et al. | | |
| 7,610,184 B1 | 10/2009 | Tillman et al. | | |
| 7,710,417 B2 | 5/2010 | Ramshaw | | |
| 7,920,996 B2 * | 4/2011 | Harada | ............................. | 703/2 |
| 8,364,739 B2 * | 1/2013 | Baskaran et al. | ............. | 708/607 |
| 8,457,932 B2 * | 6/2013 | Langemyr et al. | ................ | 703/2 |
| 2004/0168112 A1 * | 8/2004 | Kim et al. | ...................... | 714/752 |
| 2009/0282207 A1 * | 11/2009 | Burkart et al. | ................ | 711/170 |
| 2010/0145632 A1 | 6/2010 | Roh et al. | | |

FOREIGN PATENT DOCUMENTS

| | | |
|---|---|---|
| GB | 2457267 A | 8/2009 |
| JP | 2009199430 | 2/2008 |
| WO | WO2009143068 A2 | 11/2009 |

OTHER PUBLICATIONS

Amada et al: "Particle-Based Fluid Simulation on GPU"; ACM Workshop on General Purpose Computing on Graphics Processors and SIGGRAPH, 2004.
"Anzt et al: ""Energy efficiency of mixed precision iterative refinement methodsusing hybrid hardware platforms""; Comput Sci Res Dev (2010) 25: 141-148".

(Continued)

*Primary Examiner* — Jason M Repko
*Assistant Examiner* — Yuehan Wang (57) ABSTRACT

In order to perform computation concerning a large sparse matrix of values, a computer stores in its memory the nonzero values of each row and as many null or preferably zero values as are required to make up a predetermined number of stored values for each row. Associated column indices are also stored. Storage in this format can be carried out by massively parallel processing using a graphics processing unit. The format is acceptable input for programs written to expect input in conventional compressed sparse row format yet avoids the constraints which enforce serial processing in order to store in that conventional format.

18 Claims, 6 Drawing Sheets

(56) References Cited

OTHER PUBLICATIONS

Baraniuk, R G: "Compressive sensing"; IEEE Signal Processing Magazine pp. 118-120&124 Jul. 2007.
Barrett et al., Templates for the Solution of Linear Systems: Building Blocks for Iterative Methods; SIAM, Philadelphia, 1994, pp. 5-7,19-30 and 51-71.
Buatois et al "Concurrent Number Cruncher: An Efficient Sparse Linear Solver on the GPU" Lecture Notes in Computer Science year:2007 p. 358-371.
Candes et al: "An introduction to compressive sampling: A sensing/sampling paradigm that goes against the common knowledge in data acquisition"; IEEE Signal Processing Magazine 25 (2), pp. 21-30 (2008).
Candes, E J: "The restricted isometry property and its implications for compressed sensing"; Comptes rendus Mathématique vol. 346 iss:9-10 p. 589-592 (2008).
Cleary et al "Smoothed particle hydrodynamics: status and future potential" Progress in Computational Fluid Dynamics, vol. 7 pp. 70-90, (2007).
Crespo et al: "Development of a Dual CPU-GPU SPH Model"; 5th International SPHERIC Workshop, Manchester, pp. 401-410 Jun. 2010.
Cummins et al: "An SPH Projection Method"; Journal of Computational Physics 152, 584-607 (1999).
Donoho, D L: "Compressed Sensing" Report, 2004, Stanford University.
Donoho, D L: "Compressed Sensing"; IEEE Transactions on Information Theory, vol. 52, No. 4, pp. 1289-1306 Apr. 2006.
Hegeman et al: "Particle-Based Fluid Simulation on the GPU" Lecture Notes in Computer Science (including subseries Lecture Notes in Artificial Intelligence and Lecture Notes in Bioinformatics) LNCS 3994, pp. 228-235, 2006.
"Kabashima et al: ""A signal recovery algorithm for sparse matrix based compressed sensing""; Arxiv preprint arXiv:1102.3220, available at http://arxiv.org/abs/1102.3220 (Feb. 16, 2011)".
Press et al: "Numerical Recipes: The Art of Scientific Computing", Cambridge University Press, 2007, pp. 75-93.
"Shao et al: ""Incompressible SPH method for simulating Newtonian andnon-Newtonian flows with a free surface""; Advances in Water Resources 26 (2003) 787-800".
Stock et al: "A Fast GPU Implementation for Solving Sparse III—Posed Linear Equation Systems"; : Lecture Notes in Computer Science (including subseries Lecture Notes in Artificial Intelligence and Lecture Notes in Bioinformatics) pp. 457-466, 2010.
Wang et al "Solving Sparse Linear Systems on NVIDIA Tesla GPUs" Lecture Notes in Computer Science year:2009 p. 864-873.
Zhang et al "Block based compressive sampling for digital pixel sensor array" Proceedings of the 2nd Asia Symposium on Quality Electronic Design, ASQED 2010, art. No. 5548164, pp. 9-12 (2010).
Haupt et al: "Robust support recovery using sparse compressive sensing matrices"; 2011 45th Annual Conference on Information Sciences and Systems, CISS 2011, art. No. 5766202; Date of Conference Mar. 23-25, 2011.
Search Report of British Application Serial No. GB 1105576.1 dated Aug. 5, 2011.

\* cited by examiner

PARALLEL COMPUTATION OF MATRIX PROBLEMS

CROSS-REFERENCE TO RELATED APPLICATION

This application claims priority to British Application Serial No. GB 1105576.1 filed Apr. 1, 2011, which is incorporated herein in its entirety by reference.

FIELD AND BACKGROUND

Embodiments of this invention are concerned with the construction and operation of computers handling a large sparse matrix of data values.

Parallel processing, in which a number of processors operate concurrently to carry out portions of an overall computation task can give a great increase in speed compared with a single processing unit carrying out these portions of the task serially, i.e., in sequence. The term "massively parallel computing" was originally used in the context of so-called supercomputers in which a large number of processors operate in parallel and the computer operation was carried out with fine granularity (i.e., with the overall task broken up into small amounts of computation carried out concurrently). The term "massively parallel" is now also applied to a somewhat similar approach carried out using multiple cores on a single chip. (The term "core" indicates a processor able to read and execute instructions). This arrangement with multiple cores on a single chip is characteristic of graphics processing units (GPUs) as used in computer games devices and on graphics cards for desktop computers. It is possible to program a computer equipped with a GPU so that the graphics processor on that card is used to carry out parallel computation. Application Programming Interfaces (APIs) for general purpose computation on GPUs have been published by manufacturers of graphics cards and the use of GPUs for general purpose computing is an area of active interest.

Parallel processing provides an advantage in computing speed and power, but requires additional organization in hardware and software, in particular to distribute portions of the task to different cores and to take account of the fact that the portions of the task carried out asynchronously by the different cores will not finish simultaneously nor even in a predetermined order.

There is a wide range of fields where it is desirable to carry out computer processing of a large sparse matrix of data. A sparse matrix is one where many values are zero.

Notably it may be desired to compute the solution to a problem in linear algebra of the general format:

$$Ax=b$$

where A is a large sparse matrix of values, x is a vector of unknown values and b is a vector of known values.

Because of the size of the matrices, an iterative approach is used to compute the solution to the problem. In order to avoid filling a vast amount of memory with zero values it is known to store a large sparse matrix in "compressed sparse row" (CSR) format in which the information is stored as three arrays, which are a vals array containing the non-zero data values, a cidx array containing the matrix column indices for the non-zero values and an ridx array of integers which are pointers to the position in the vals array (and also in the cidx array) at which each new row begins. The final value of the ridx array gives the total number of elements stored, equal to the length of the vals array. This format greatly reduces the memory requirements.

A number of software programs which provide functions to solve problems of this Ax=b form are available and are referred to as "linear solvers." The CSR format is the standard input format for these linear solvers. Many of these linear solvers are programs which perform the computing of data in a serial fashion. Linear solvers which operate on parallel processors such as GPUs have been described in the literature, notably by Buatois et al "Concurrent Number Cruncher: An Efficient Sparse Linear Solver on the GPU" Lecture Notes in Computer Science, year: 2007 pg: 358-371 and Wang et al. "Solving Sparse Linear Systems on NVIDIA Tesla GPUs" Lecture Notes in Computer Science year: 2009 pg: 864-873. A library of linear solver programs which operate on parallel processors is available under the trade name SpeedIT from Vratis Ltd, Wroclow, Poland (www.vratis.com).

As mentioned, the CSR format is a standard storage format for data from a large sparse matrix. There is also an equivalent "compressed sparse column" format which has an array of row indices and an array of pointers to the start of new columns.

SUMMARY OF THE INVENTION

The present inventor has appreciated that the speed benefit of massively parallel processing cannot extend to storing a matrix in CSR format because some of the steps involved require knowledge of the results of earlier steps. Specifically, the number of nonzero values which are found by computation to be present in a matrix row is required information to determine where to begin storing nonzero values of the next row in the vals array (and likewise where to begin storing their column indices in the cidx array). It is also required for creating the ridx array of CSR format. This constraint necessitates serial processing of one row after another, in row order.

In one aspect, the invention seeks to overcome this limitation and provides a scheme of storing data in memory, i.e., a format, which can be set up by means of parallel processing. In this aspect, this invention provides a computer implemented method for establishing or representing a sparse matrix of data, comprising: for each line of a sparse matrix, storing in memory the non-zero values from that line of the matrix and also a number of null or zero values, such that the overall number of stored values for the line is a predetermined number and storing the indices which denote positions in the matrix line for at least the stored non-zero values.

It is envisaged that storage of values by row will usually be required, as with CSR format, in which case the lines of the matrix referred to above will be rows of the matrix and the indices which denote the positions of values in the rows will be the column indices of those values. In this case the method can be stated as: for each row of a sparse matrix, storing in memory the non-zero values from that row of the matrix and also a number of null or zero values, such that the overall number of stored values for the row is a predetermined number and storing the column indices for at least the non-zero stored values.

However, it is within the scope of this invention to use the equivalent format with rows and columns interchanged so that the method comprises: for each column of a sparse matrix, storing in memory the non-zero values from that column of the matrix and also a number of null or zero values, such that the overall number of stored values for the column is a predetermined number, and storing the row indices for at least the non-zero stored values.

The data stored in memory may be stored as two arrays, one containing data values, possibly as floating point numbers, and the other containing indices which may be stored as integers. These arrays may be approximately equivalent to the vals and cidx arrays of CSR format. It is not necessary to have a third array corresponding to the ridx array of the CSR format, provided that the predetermined number of data values stored for each row is known when the stored data is used.

However, it is an advantage of this invention that storage in a format of this invention oriented by rows can easily be made compatible with existing linear solvers written to accept CSR format, thereby allowing the stored values to be used for further computation by an existing linear solver. Such compatibility may be achieved by storing zero values rather than storing null values, storing the column indices of these zero values as well as column indices of nonzero values, and generating and storing an array which can be recognized as pointers to new rows, equivalent to the ridx array of the CSR format. The zero values can be arbitrarily chosen from those in the relevant row of the matrix. The array of pointers can be generated at any convenient stage, because it is no more than a regular series of numbers. By embodying the invention in this way, the three arrays can then be recognized as suitable input by existing linear solvers which expect input to be in CSR format.

The method of this aspect of the invention is likely to include a step of computing a plurality of the matrix values concurrently, using processors operating in parallel. In some embodiments the method may comprise a subsequent step of computation using the stored data, wherein a plurality of stored data values are used in respective processes performed concurrently using processors operating in parallel. Such computation may proceed by an iterative process.

The invention's format for storage of data in computer memory will generally be used in connection with mathematical calculation by computer. Thus, some embodiments of this invention can be stated as a computer implemented method for mathematical calculation with a set of values capable of representation as a matrix wherein individual values have associated indices identifying a line of the matrix and position in the line and the matrix contains more zero values than non-zero values, comprising calculating values in the set by means of multiple processors operating in parallel, storing in computer memory the calculated non-zero values for each line of the matrix plus as many null or zero values as are required to make up a predetermined overall number of stored values for each line, and also storing in computer memory indices denoting the positions of the stored values in their line of the matrix.

The mathematical calculation relates to data values which can be written out in the form of a matrix. This will be a sparse matrix in which zero values outnumber non-zero values. It is for such matrices that a compressed storage format is valuable in saving the amount of computer memory required to store data.

Storage of the data may be done in order to use it in solving an equation of the general form:

$$Ax=b$$

where A is a large sparse matrix of values, x is a vector of unknown values and b is a vector of known values, which is a common problem in linear algebra.

There are diverse fields in which such calculations are required. In some forms of this invention the method is used in a computer model or computer simulation. This may be a simulation of a changing system where calculation and equation solving are needed for each successive change or time step of the simulation. Embodiments of the invention may be used in computer simulation of a physically moving system such as for instance modelling fluid flow.

One procedure for modelling fluid flow is incompressible smoothed particle hydrodynamics which can require solution of an equation of the abovementioned form $Ax=b$ for each time step of the simulation. Thus, an aspect of this invention can be stated as a computer implemented method of simulating fluid flow by smoothed particle hydrodynamics in which the fluid is represented as a set of particles, each step of the simulation comprising computing values for interaction of each particle with other particles within a predetermined radius, storing the computed values in computer memory as an array of data values, storing a related array of integers identifying said other particles and carrying out a linear algebraic calculation using the stored data values and integers, wherein the stored data values for each particle are made up to a predetermined number of stored values by including null or zero values, such as zero values for interaction with one or more particles outside the predetermined radius and computation of the stored values for a plurality of particles is carried out by processors operating in parallel.

Implementation of this invention is not limited to any specific type or architecture of computer. However, in some embodiments a first processing unit allocates the computation of each data value to a respective thread of processing steps and allocates each such thread to one of a plurality of processors operating in parallel which executes the thread and returns a computed value.

For computing the matrix values which are stored and for subsequent computation using those values, the processors operating in parallel may be cores within a graphics processing unit (GPU).

A computer may comprise a central processing unit and a graphics processing unit containing a plurality of cores (i.e., individual processors) operating in parallel. A GPU may typically have over 100 cores, quite possibly between 200 and 500 cores and perhaps even more than this. The total number of values in a large sparse matrix may well be much greater than 500, in which case the CPU may operate the GPU so that its cores process threads in parallel while further threads are loaded into memory of the GPU ready to be processed.

The handling of threads may be run by extensions to a programming language which do not reveal the order in which they are allocated and processed, so that the computer program written to carry out the storage of data values must be written as if all of the values were calculated concurrently, in unknown order, and without any synchronisation of the concurrent parallel threads of computation.

The invention will be further explained and exemplified by the following detailed description and with reference to the accompanying drawings. This description is exemplary in nature and is not intended to limit the scope of the invention. Except where clearly inappropriate or expressly noted, features and components of different embodiments may be employed separately or used in any combination.

DETAILED DESCRIPTION

The distinction between storage in memory in accordance with the known CSR format and storage in accordance with the format used in this invention will first be explained by referring to the following 4×4 matrix as an illustration.

$$\begin{bmatrix} 1.0 & 1.4 & 0.0 & 3.0 \\ 0.0 & 1.0 & 0.0 & 0.0 \\ 0.0 & 0.0 & 1.0 & 5.2 \\ 7.1 & 0.0 & 0.0 & 1.0 \end{bmatrix}$$

The columns of the matrix are numbered 0, 1, 2 and 3 with column 0 at the left and the rows are numbered 0, 1, 2 and 3 with row 0 at the top. In CSR format, the data contained in the matrix is stored in three arrays which are:

vals=[1.0 1.4 3.0 1.0 1.0 5.2 7.1 1.0]
cidx=[0 1 3 1 2 3 0 3]
ridx=[0 3 4 6 8]

The vals array contains the nonzero values which may be floating point numbers. The cidx array contains the column indices (i.e., the numbers of the columns) for these nonzero values. The column indices are of course integers. The positions in these two arrays number upwards from zero. Thus the value 3.0 seen in row 0 column 3 is at position 2 in the vals array and its column index which is 3 is at position 2 in the cidx array.

The ridx array contains integers which show where values in the vals array have started a new row. Thus the first integer in the ridx array has to be 0, indicating that the first number in the vals array is the first number to belong to the top row in the matrix. The next integer in the ridx array is 3, which indicates that the value at position 3 in the vals array is the first nonzero number to belong to the second row in the table, and so on. The final value of the ridx array gives the total number of elements stored, equal to the length of the vals array.

Using a format which is in accordance with the present invention, it would theoretically be possible for the data of the same matrix to be stored as the following two arrays:

vals=[1.0 1.4 3.0 1.0 NULL NULL 1.0 5.2 NULL 7.1 1.0 NULL]
cidx=[0 1 3 1 NULL NULL 2 3 NULL NULL 3 NULL]

In this example it has been decided in advance that not more than three nonzero values are expected in each row of the matrix, and so the nonvero values from each row are made up to a set of three values by storing null values in the vals array.

It can be seen from the matrix and arrays set out as example above, that for the top row of the matrix the stored values are the three nonzero values. For the second row of the matrix these stored values are the sole nonzero value in that row plus two null values. The cidx array gives the column indices for the stored non-zero values in the vals array. These two arrays, plus the predetermination to store three items for each row of the matrix provide all the information which would be required to reconstruct the matrix and therefore these could be used as input for a linear solver.

A linear solver able to accept the above arrays as input might be a version of an existing linear solver modified to receive a different input format. However, for the sake of full compatibility with existing linear solvers, it is preferred to store the following three arrays:

vals=[1.0 1.4 3.0 1.0 0.0 0.0 1.0 5.2 0.0 7.1 1.0 0.0]
cidx=[0 1 3 1 0 0 2 3 0 0 3 1]
ridx=[0 3 6 9 12]

As mentioned already, for this example it has been decided in advance that three values are to be stored for each row of the matrix. The nonvero values from each row are made up to a set of three stored values by storing values of zero in the vals array. These values of zero are taken from the sparse matrix, which includes many zeros in each row. The column indices of these zero values are recorded in the cidx array. It would be possible to select as many zero values from a row as required and store each one in the vals array while also storing its associated column index in the cidx array. However, it has been found possible and more convenient to use the same zero value more than once. This is illustrated by the two zero values at positions 4 and 5 in the vals array which both have column index of zero in the cidx array. The cidx array is simply an array of integers incremented by three and a final value at the end of the array which is the total number of elements stored.

The above explanation of the CSR format and the format of this invention has referred to a matrix which is a mere 4×4 matrix and which is fairly fully populated with nonzero values. This was done for the purpose of explanation. These formats are intended to be used with matrices which are much larger and more sparsely populated with nonzero values. Without being limited to a specific example, it is possible that a matrix might have a million rows and columns yet have less than 200 nonzero values in any row and only one nonzero value in many of the rows (the value on the diagonal).

It will be appreciated that the CSR format is economical with memory because it stores only the nonzero values and associated column indices. Secondly, it does not place a limit on the number of nonzero values: it would remain meaningful even if the matrix was filled with nonzero values. In contrast, the format of the invention places a limit on the number of nonzero values which may appear in a row because the maximum number of values stored for a row is predetermined. The format of the invention also stores some zero values, thus slightly increasing the amount of memory required for storage of the arrays. However, the inventor has recognized that these are not significant disadvantages and are outweighed by the possibility of creating the matrix by parallel processing.

The maximum number of nonzero values in a row may be constrained by the context which gives the data values. If necessary the correctness of the choice of a maximum number of nonzero values in a row can be tested by repeating the computation with a higher maximum number.

As the present inventor has recognized, the information required to determine array positions in the vals and cidx arrays of the conventional CSR format, and which is also used to create the ridx array, is determined by the computation of the number of nonzero values in each preceding row. This enforces a serial processing procedure.

By contrast, using the format of the invention the array of values and the array of associated column indices can be created by parallel processing. The ridx array is either dispensed with or is easily created, by calulation directly from the predetermined number of values to be stored for each row.

Working with large sparse matrices is a common requirement and the format for described above storage in memory in accordance with this invention may be utilised in a variety of circumstances. However, one context in which it may be used is incompressible smoothed particle hydrodynamics. This is a mathematical technique which is able to model or simulate liquid flow and is useful in a range of fields. A review by Cleary et al., "Smoothed particle hydrodynamics: status and future potential," *Progress in Computational Fluid Dynam-*

*ics*, Vol. 7, pages 70-90, (2007) mentions a range of fluid flow problems where the technique can be applied.

Large sparse matrices may be used in computation in the fields of reservoir simulation and prediction, geological and geomechanical modeling, simulation and prediction and in the interpretation of seismic survey data. Large sparse matrices may also be used in connection with compressive sampling of signals or data, as illustrated for instance by Candes and Wakin, "An Introduction to Compressive Sampling" IEEE Signal Processing Magazine March 2008 pages 21-30, (note equation 7) and Zhang et al., "Block based compressive sampling for digital pixel sensor array," Proceedings of the 2nd Asia Symposium on Quality Electronic Design, ASQED 2010, art. no. 5548164, pp. 9-12. Embodiments of the invention may be used in connection with any of these fields.

The use of the format of the invention in connection with modeling by means of incompressible smoothed particle hydrodynamics will be described below by way of example.

Figure 1:
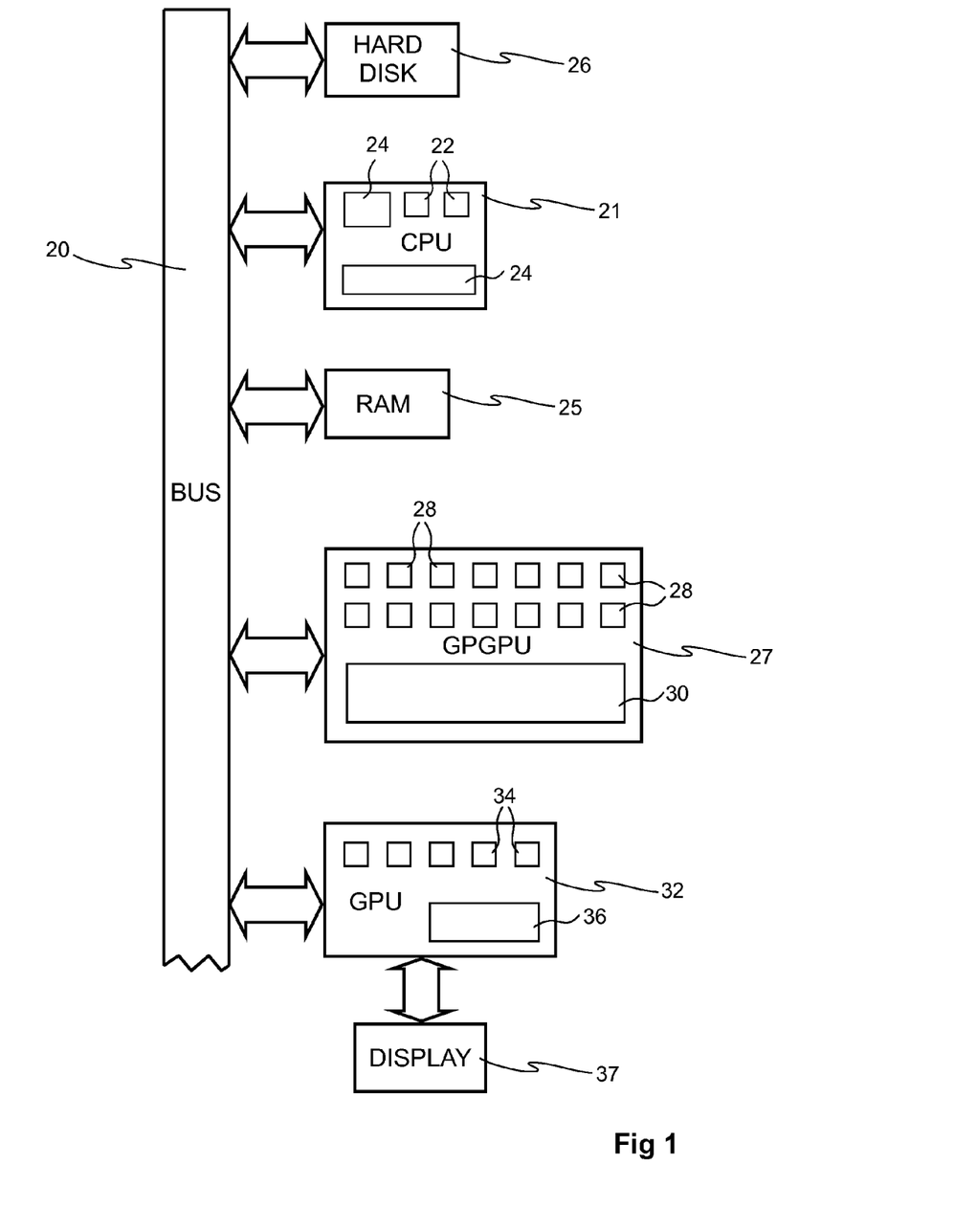
FIG. 1 illustrates the architecture of a computer including a general purpose GPU used for performing a simulation which includes a step of creating a large sparse matrix of values and storing them in memory.

FIG. 1 diagrammatically illustrates the architecture of a computer which may be used to carry out parallel processing on a GPU. It has a number of components connected in conventional fashion to a data and control bus 20. The CPU 21 may have a single core (that is to say the part of the CPU which is able to read and execute instructions) or it may have a small plurality of cores 22. The CPU also incorporates cache memories 24. The bus 20 connects the CPU to random access memory (RAM) 25 and to a hard disk 26. The hard disk 26 plays no part in the processing described here, except as source of initial data and non-volatile store of final results.

The bus 20 also connects to a GPU 27 which is used in parallel computation but not graphic display. This is denoted as GPGPU (general purpose graphics processing unit). This GPGPU 27 has a large number of cores 28 and also has a substantial amount of memory 30, customarily termed global memory, accessible by any core. The bus 20 also connects to a further, possibly less powerful, GPU 32 with cores 34 and memory 36 which drives a display screen 37.

Figure 2:
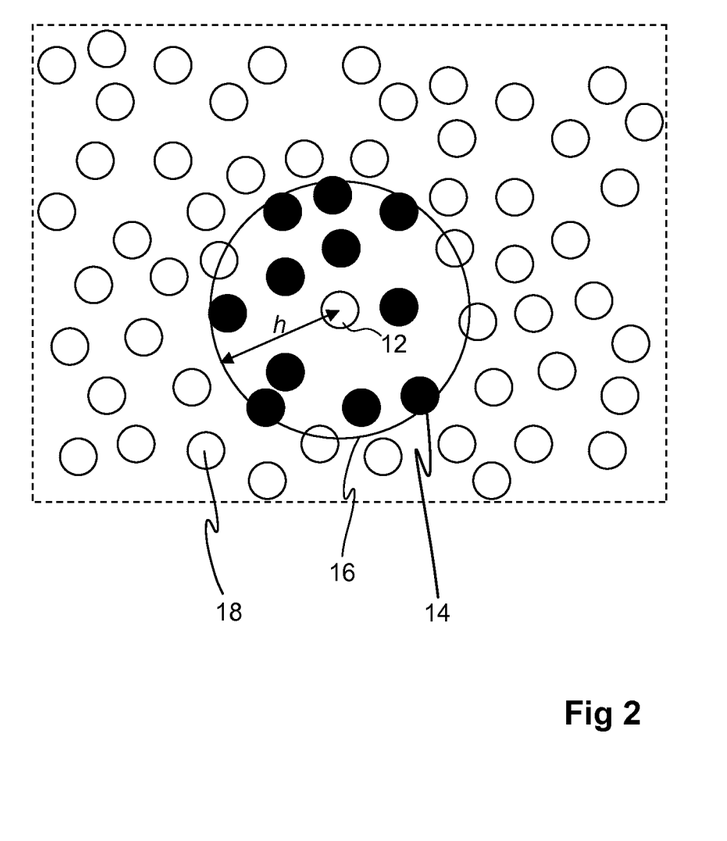
FIG. 2 is a diagrammatic cross-sectional view showing particles in a smoothed particle hydrodynamics simulation.

FIG. 2 is a diagrammatic cross-sectional view which illustrates relationships used by the simulation. The fluid which is to be modeled or simulated is notionally represented as small quantities. These small quantities of fluid have mass and it is customary to refer to them as "particles." In incompressible smoothed particle hydrodynamics it is considered that the properties of each particle are affected by the other particles within a sphere having predetermined radius h, but not by particles outside this radius. So the properties of the particle 12 are affected by the neighbor particles 14 (shown as filled circles) lying within the sphere 16 of radius h centered on particle 12 but are not affected by the particles 18 (shown as open circles) outside the sphere 16.

The procedure of smoothed particle hydrodynamics requires solution of a linear algebra problem having the general form Ax=b, using a large sparse matrix A of coefficients. Each particle is allocated one row of the matrix and so an element in the matrix may be denoted $A_{ij}$, where i denotes the row index (i.e., row number) associated with the particle of interest and j denotes a column index. Each column in the matrix is also allocated to one particle. Elements on the diagonal (i.e., elements $A_{ij}$ where i and j are equal) are always nonzero values. Each other element in a row relates to the relationship between the particle associated with that row and another particle. These elements have a nonzero value if and only if the other particle lies within radius h. The model or simulation may involve millions of particles, but for each particle the number of neighbors is limited by geometry and will typically not exceed 150. Thus the maximum number of nonzero values in any row will not exceed 150 and this is chosen as the predetermined number of values which are stored in memory for each matrix row. The locations of the nonzero elements in the matrix are not known until calculation is carried out.

Figure 3:
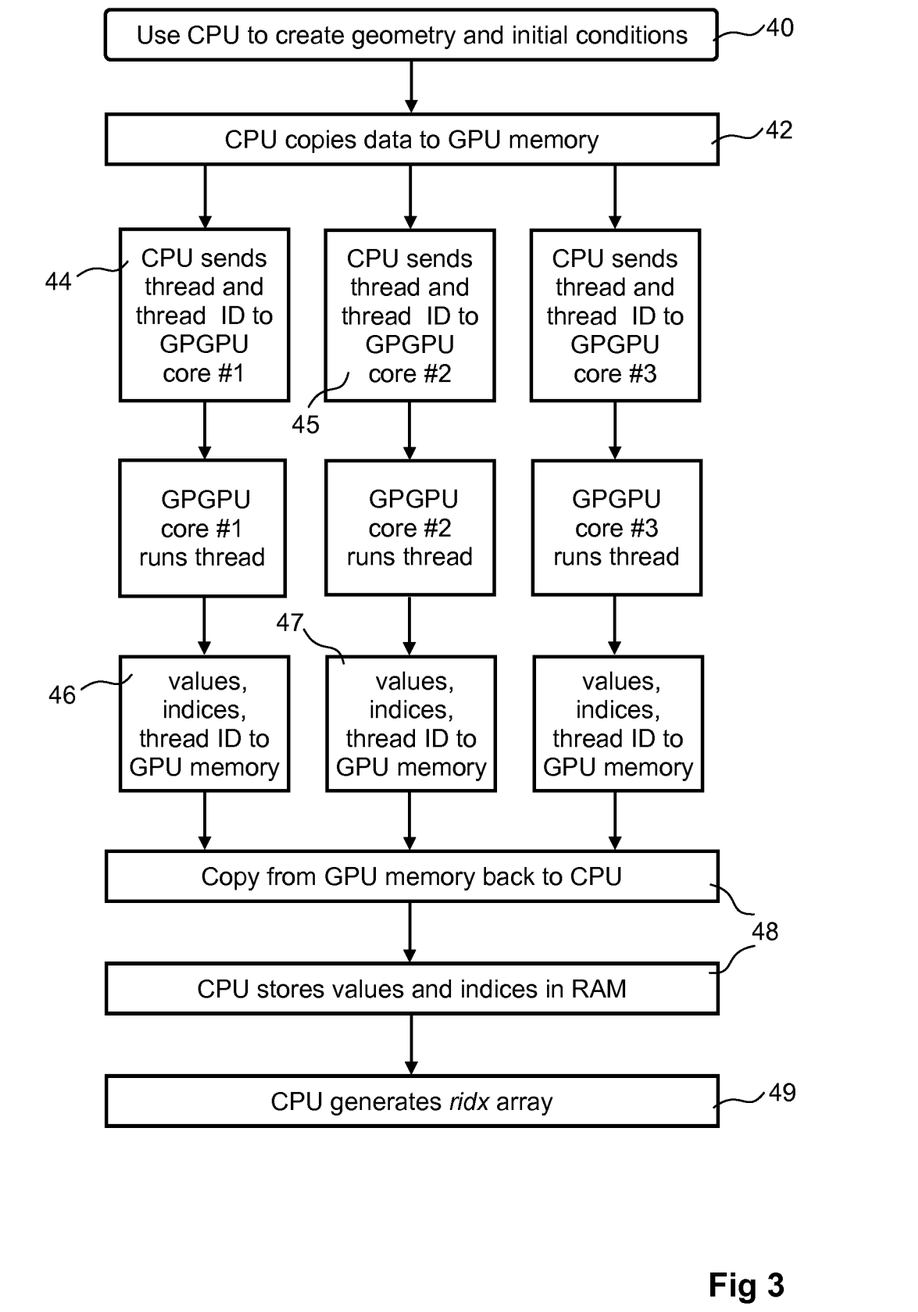
FIG. 3 illustrates parallel processing of the computation of values.

FIG. 3 schematically illustrates the operation of the computer to run threads in parallel in order to compute the data representing large sparse matrix A and store it in memory.

In initialisation step 40, the computer program operates the CPU to set up the geometry of the simulation and the initial conditions. It then, at 42, copies data required for computing the matrix values to the memory 30 on the GPGPU 27. After this, the CPU launches threads to run in parallel on the GPGPU. Each thread runs on one core 28 of the GPGPU 27 and is a workflow of instructions to compute values in one row of the matrix A. The values in one row relate to one particle, such as particle 12.

Each particle has an identifying number which provides the row index in matrix A for that particle. The CPU launches a thread by sending instructions to be performed on one core 28 of the GPGPU 27 and also sends an identifier for the thread, i.e., the thread ID. The row index in matrix A is used as this thread ID. As shown by FIG. 3, when the CPU has launched a thread on core #1 of the GPGPU as shown at 44, it launches a similar thread for another row of matrix A on core #2 as indicated at 45, then yet another similar thread on core #3 followed by threads on cores #4 onwards (not shown) and so on until all the cores have been put to work. When threads have been launched on every core 28 of the GPGPU, the CPU waits until threads have been completed and then launches further threads as cores become available. To improve speed, instructions to launch threads may be cached in the GPGPU memory 30 while other threads are still running.

Figure 4:
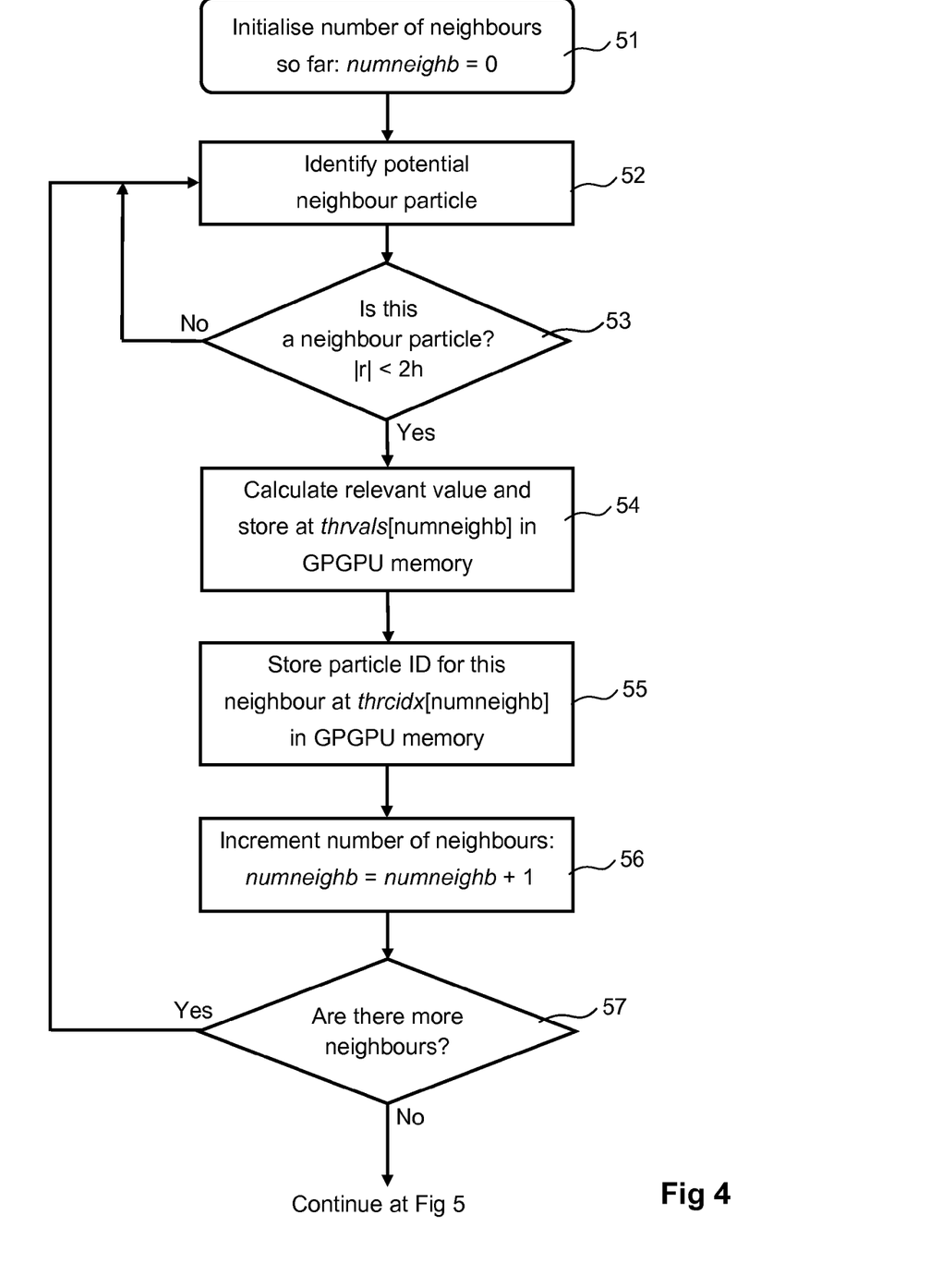
FIGS. 4 and 5 show the workflow of operations carried out on one core of the general purpose GPU.
Figure 5:
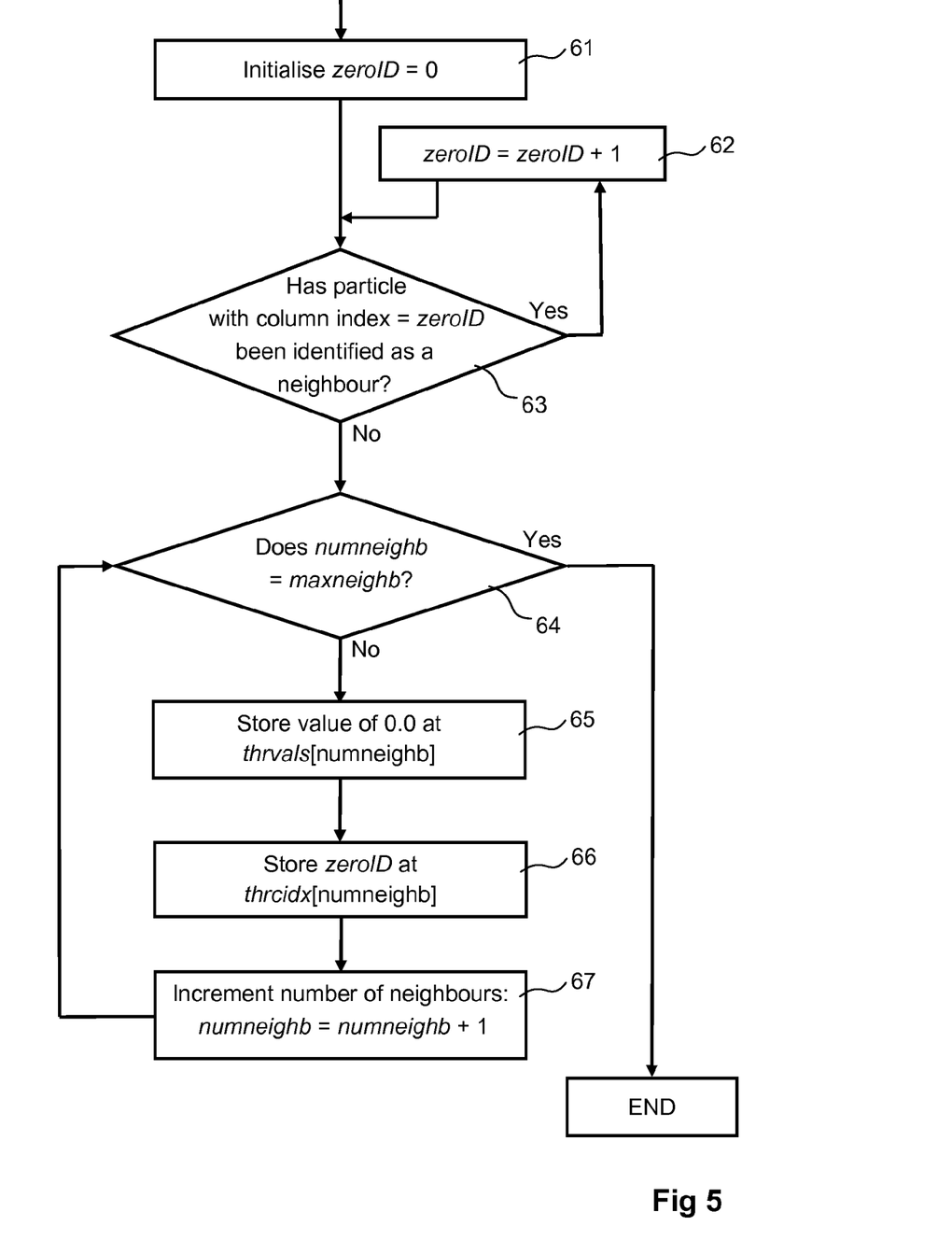

FIGS. 4 and 5 show the two parts of the workflow carried out by such a thread on a core of the GPGPU to create and store one row of the large sparse matrix A. The number of values, both nonzero and zero to be stored for a row is chosen (for example 150) and that quantity is shown here as maxneighb. At the beginning 51 of the workflow a variable numneighb is created and set to zero. Then as shown in FIG. 4, steps 52 to 57 run as a loop in which steps 52 and 53 determine whether other particles lie within radius h and if so proceed to step 54 which is to compute the nonzero value of a matrix element and store it in the GPGPU memory 30 in an array thrvals which is specific to the individual thread and step 55 which is to store the associated column index in the GPGPU memory 30 in an array thrcidx which is likewise specific to the individual thread. Each time a nonzero value is stored, a variable numneighb is incremented (step 56). When this loop has been run for all potential neighbor particles the workflow moves on to a second part, shown in FIG. 5.

This part of the workflow stores zero values so that the number of values stored for each row is made up to the predetermined number maxneighb. A variable zeroID is initialized to zero at step 61. The loop of steps 62 and 63 increments along the matrix row, using the current value of zeroID as the column index, until it finds a particle which is not a neighbor and therefore has a zero value. The workflow then proceeds to step 64 which tests whether the number of values already stored, recorded as variable numneighb, is less than the predetermined number maxneighb. If so, steps 65 and 66 insert the zero value identified at step 63 and its column index as into the vals and cidx arrays in GPGPU memory respectively. The loop back from step 67 to 64 causes the insertion at steps 65 and 66 to take place as many times as necessary to bring the number of stored values up to the predetermined number maxneighb.

When a thread has completed on a core of the GPGPU, a predetermined number of values in one row of the matrix A and their associated column indices are stored in the GPGPU memory 30 in arrays thrvals and thrcidx which are specific to that thread and hence that row of the matrix A. This storage in GPGPU memory 30 is generally indicated at 46 and 47 in FIG. 3. The thread ID, corresponding to a row number, is also placed in some way in the GPGPU memory 30. It may be stored in memory 30 as an integer or the thread ID may be identifiable by a memory location of the thrvals and thrcidx arrays.

The next step 48 in FIG. 3 is that the stored values from the thrvals and thrcidx arrays in the GPU memory are copied back to the CPU which then transfers them to vals and cidx arrays in RAM 25. The CPU uses the associated thread ID and the predetermined number of values maxneighb to determine where the values and indices from the thrvals and thrcidx arrays are placed in the vals and cidx arrays in RAM 25. The values and column indices for row 0 of matrix A are copied to positions 0 to 149 of the vals and cidx arrays (because maxneighb=150). The values and column indices for row 1 are copied to positions 150 to 299 and so on. This is more generally stated as transferring the values and column indices for thread ID=n to positions $n \times$maxneighb up to $(n+1) \times$maxneighb$-1$ and as already mentioned thread ID is also the row number in matrix A.

The final step 49 of the overall procedure is that the CPU generates and stores a ridx array in RAM 25. This array is simply a series of integers calculated by the CPU from maxneighb. It is ridx=/0 maxneighb-1 2×maxneighb-1 3×maxneighb-1

The outcome of the processing illustrated by FIGS. 3 to 5 is that the data of matrix A has been computed and stored in a form in accordance with this invention, in RAM 25. The data can then be used to solve an equation of form Ax=b and this equation solving may also be done with parts of the computation processed in parallel on the GPGPU. The calculation of matrix A and its use to solve such an equation may be done at each time step of a simulation of fluid flow.

It will be appreciated that the above procedure for creating and storing the arrays to represent matrix A does not require anything to be computed with prior knowledge of another computed value. The value of maxneighb is predetermined in advance. The values and column indices which are stored for each row are placed in matching positions in the thrvals and thrcidx arrays for that thread and are then transferred to blocks of positions in the vals and cidx arrays which are determined from the row index. Consequently storage in the vals and cidx arrays in RAM does not need to proceed in any linear order and instead can be done as soon as results from the parallel threads become available.

The piece of information which is the row index needs to be carried through the parallel processing. In the example above this is done by using the row index as the thread ID and it may be a stored as an integer at the completion of the thread, or it may be incorporated into a memory address associated with values and column indices determined by the thread.

Figure 6:
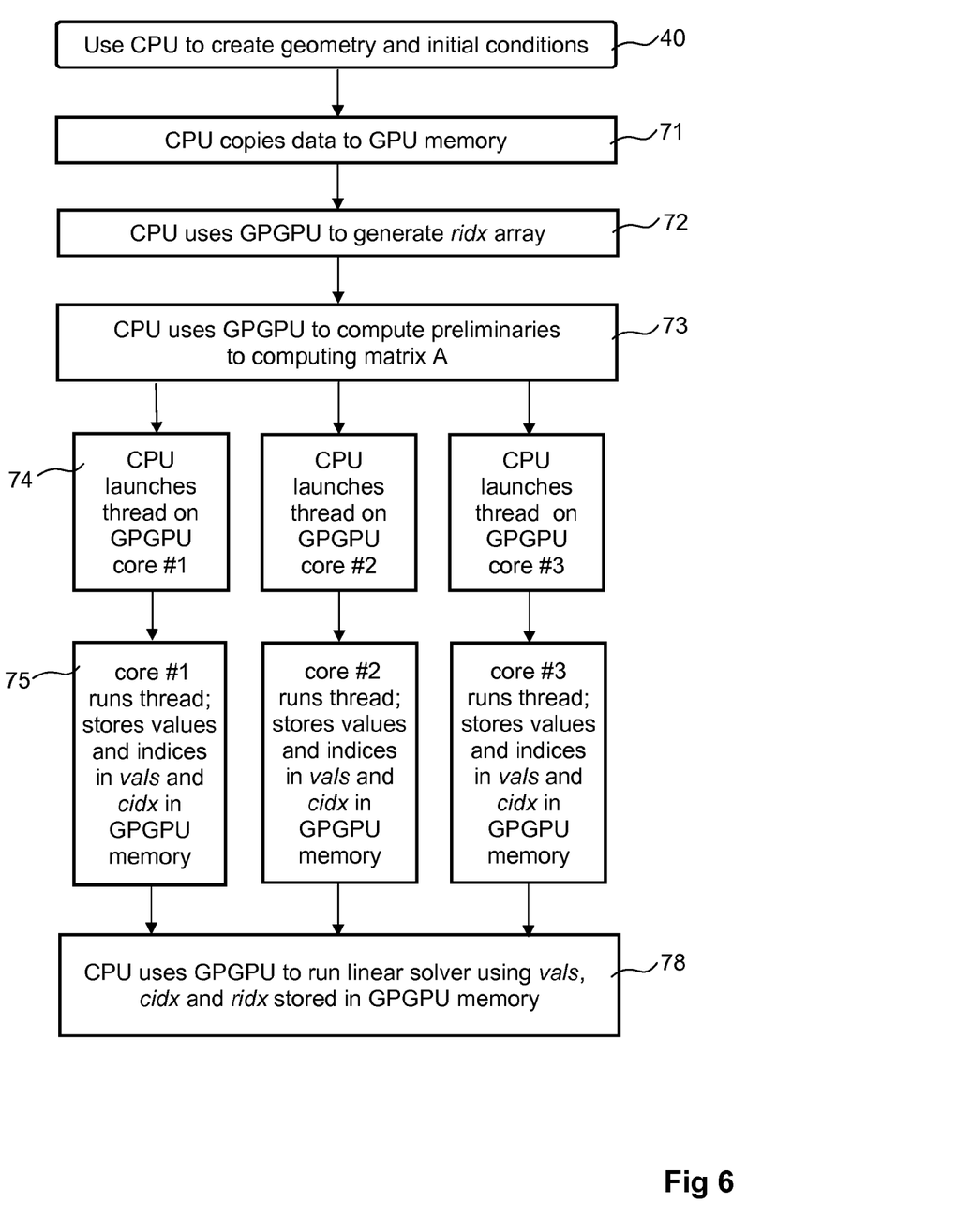
FIG. 6 illustrates another form of parallel processing of the computation of values.

FIG. 6 schematically illustrates another form of operation of the computer. It is analogous to FIG. 3, but makes more use of the memory 30 on GPGPU 27, reduces transfers of data via bus 20 and stores the data representing large sparse matrix A in memory 30 of the GPGPU.

As before, initialisation step 40 sets up the geometry of the simulation and the initial conditions. Then at step 71 the CPU, copies data required for computation to the memory 30 on the GPGPU 27. At step 72 the CPU runs threads on the GPGPU cores 28 to create the ridx array from the predetermined number maxneighb=150. This is followed at step 73 by computations run in parallel on the GPU relating to particles in the simulation which generate data needed for calculating the values in the matrix A. The results are stored in the memory 30. (The threads for these steps on the cores 28 of the GPGPU are not depicted individually in FIG. 6).

Next the CPU starts to launch threads on the GPGPU which perform workflows to calculate and store the data of matrix A in a format in accordance with this invention. As indicated at 74, the CPU launches a thread to run a workflow on core #1, then it goes on to launch similar threads on core #2, core #3 and so on. Running these threads on the cores is indicated at 75. These workflows use data already placed in memory 30 at step 73. Each workflow is almost identical to that shown in FIGS. 4 and 5, except that the steps 54, 55, 64 and 65 store values and indices directly into vals and cidx arrays in the GPGPU memory 30, using the thread ID information to determine storage positions in these arrays, in the same manner as described above for storage in RAM 25.

The outcome of the processing up to this point in FIG. 6 is that the data of matrix A has been computed and stored in a form in accordance with this invention, in memory 30. The CPU then goes directly on at step 78 to run a linear solver as parallel processing on the GPGPU 27, using the vals, cidx and ridx arrays stored in memory 30 (although the parallel threads are again not depicted individually in FIG. 6).

The invention claimed is:

1. A computer implemented method for mathematical calculation with values capable of representation as a sparse matrix of data, comprising
   providing a computer having a first processor and a plurality of further processors capable of operating concurrently to execute threads of processing steps separately and without synchronisation;
   making a preliminary predetermination of a required number of values to be stored for each line of the matrix, the required number being less than the length of the line; followed by:
   (a) for each line of the sparse matrix, storing in computer memory the non-zero values from that line of the matrix and also a number of null or zero values, such that the overall number of stored values for the line is the required number predetermined before storing the values, and
   (b) storing in computer memory indices denoting the position in the line of the stored values
   wherein the method includes at least one of (i) computing a plurality of the values in the matrix concurrently and (ii) computing using a plurality of the values in the matrix concurrently,
   the said computing concurrently comprising allocating the computing of or use of stored values to processing threads and performing the threads with a plurality of the said further processors operating in parallel, with each processor executing one thread at a time without synchronization with other processors and without control of the order of execution of the threads.

2. A method according to claim 1 wherein the first processor is a central processing unit (CPU) which allocates the computation of the values in each line to a respective thread of processing steps and the further processors operating in parallel each execute one thread at time to return computed values, associated indices and a thread identifier.

3. A method according to claim 1 wherein the processors operating in parallel are cores within a graphics processing unit (GPU) and the number of cores is at least 100.

4. A computer implemented method for mathematical calculation with a set of values capable of representation as a matrix of individual values with associated indices identifying a line of the matrix and position in the line and the matrix contains more zero values than non-zero values, the method comprising
- providing a computer having a first processor and a plurality of further processors capable of operating concurrently to execute threads of processing steps separately and without synchronisation;
- making a preliminary predetermination of a required number of values to be stored for each line of the matrix, the required number being less than the length of the line; followed by:
- allocating calculation of values in the set to multiple processing threads and performing the threads with a plurality of the said further processors operating in parallel, with each processor executing one thread at a time without synchronization with other processors and without control of the order of execution of the threads, and
- storing in computer memory the calculated non-zero values for each line of the matrix plus as many null or zero values as are required to make up an overall number of stored values for each line, the overall number being the required number predetermined before storing the values, and
- also storing in computer memory indices denoting the positions of the stored values in their line of the matrix.

5. A method according to claim 4 further comprising computation using the stored data, wherein a plurality of stored data values are used in respective processes performed concurrently, by allocating the computation using stored values to processing threads and performing the threads using a plurality of processors operating in parallel with each processor executing one thread at a time without synchronization with other processors and without control of the order of execution of the threads.

6. A method according to claim 5 wherein the said step of computation is an iterative process to solve a linear algebra problem.

7. A method according to claim 5 which is part of a computer simulation of a moving system, wherein calculation of values, storage in memory and computation with the stored values is carried out at each step of the simulation.

8. A method according to claim 4 wherein the computer has a CPU comprising the first processor and a GPU comprising the further processors, the number of further processors being at least 100.

9. A computer implemented method of simulating fluid flow by incompressible smoothed particle hydrodynamics in which the fluid is represented as a set of particles, comprising
- providing a computer having a first processor and a plurality of further processors capable of operating concurrently to execute threads of processing steps separately and without synchronisation;
- performing the simulation comprising computing values for interaction of each particle with other particles within a predetermined radius, storing the computed values in computer memory as an array of data values, storing a related array of integers identifying said other particles and carrying out a linear algebraic calculation using the stored data values and integers, wherein for each particle a required number of values to be stored is predetermined before storing the values and the stored data values for each particle are made up to a predetermined number of stored values by including null or zero values, so that the number of stored values is the required number predetermined before storing the values and computation of the stored values for a plurality of particles is carried out by allocating the computation for each particle to a processing thread and performing the threads using the plurality of further processors operating in parallel with each processor executing one thread at a time without synchronization with other processors executing other threads and without control of the order of execution of the threads.

10. A non-transitory computer readable medium, encoded with computer code carrying out a method according to claim 1.

11. A computer comprising a first processor and a plurality of further processors capable of operating concurrently to execute threads of processing steps separately and without synchronisation where the computer is configured to carry out a computer simulation of a moving system and to display the simulation on a visual display and wherein each step of the simulation comprises a method according to claim 1.

12. A non-transitory computer readable medium, encoded with computer code carrying out a method according to claim 4.

13. A non-transitory computer readable medium, encoded with computer code carrying out a method according to claim 9.

14. A computer comprising a first processor and a plurality of further processors capable of operating concurrently to execute threads of processing steps separately and without synchronisation where the computer is configured to carry out a computer simulation of fluid flow and to display the simulation on a visual display and wherein each step of the simulation comprises a method according to claim 9.

15. A computer implemented method for mathematical calculation with a set of values capable of representation as a matrix of individual values with associated indices identifying a line of the matrix and position in the line and the matrix containing more zero values than non-zero values, the method comprising
- providing a computer having a first processor and a plurality of further processors capable of operating concurrently to execute threads of processing steps separately and without synchronisation;
- making a preliminary predetermination of a required number of values to be stored for each line of the matrix, the required number being less than the length of the line; followed by:
- storing in computer memory the calculated non-zero values for each line of the matrix plus as many null or zero values as are required to make up an overall number of stored values for each line, the overall number being the required number predetermined before storing the values,
- also storing in computer memory indices denoting the positions of the stored values in their line of the matrix, and
- allocating calculation using values in the set to multiple processing threads and performing the threads with a plurality of the said further processors operating in parallel, with each processor executing one thread at a time without synchronization with other processors and without control of the order of execution of the threads.

16. A method according to claim 15 wherein the said step of computation is an iterative process to solve a linear algebra problem.

17. A method according to claim 15 which is part of a computer simulation of a moving system, wherein calculation of values, storage in memory and computation with the stored values is carried out at each step of the simulation.

18. A method according to claim 15 wherein the computer has a CPU comprising the first processor and a GPU comprising the further processors, the number of further processors being at least 100.

* * * * *